United States Patent Office 3,711,466
Patented Jan. 16, 1973

---

3,711,466
AZIRIDINYL SILANES
Heinz Uelzmann, Cuyahoga Falls, and David C. Hidinger, Jr., Akron, Ohio, assignors to The General Tire & Rubber Company
No Drawing. Filed Feb. 19, 1968, Ser. No. 706,644
Int. Cl. C07f 7/04, 7/10
U.S. Cl. 260—239 E                                            6 Claims

ABSTRACT OF THE DISCLOSURE

Aziridinyl silanes of the general formula:

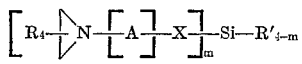

where R is hydrogen or an alkyl group of from 1 to 6 carbon atoms,
where R' is an alkyl, alkoxy, alkylthio, cycloalkyl, cycloalkoxy, or cycloalkylthio group of from 1 to 6 carbon atoms,
where each R and each R' may be the same or different,
where X is O, S, or

where A is a hydrocarbon chain which can be interrupted by ether, thioether, ester, or

linkages, which can contain alkoxy, alkylthio, or acetal side groups that are attached to the carbon atoms of the hydrocarbon chain and that do not interfere with the aziridinyl radical, and which has a total of from 2 to 20 carbon atoms, the nitrogen atom of the aziridine group being attached to a carbon atom of A, X being attached to a carbon atom of A, and
where m is an integer of from 1 to 4 are prepared in a variety of ways, e.g., by reaction of hydroxy aziridino compounds with chlorosilanes in the presence of a basic HCl scavenger or by addition of an aziridino compound having a hydrogen on the nitrogen atom of the imino ring with a silane containing an activated double bond. The new aziridinyl silanes are useful in crosslinking and chain-ending carboxylic group containing polymers and in forming compositions to make gaskets, puttys, caulking, weatherstripping, etc.

BACKGROUND OF THE INVENTION

Ethylenimine is the simplest form of an aziridinyl compound. These products contain one or more aziridinyl groups of the generic formula:

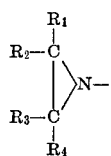

wherein R₁, R₂, R₃ and R₄ may be the same or different radicals including hydrogen, alkyl, cycloalkyl, aryl, heterocyclo, etc.

This class of compound has received much attention in the past decade because of the potential reactivity of the aziridinyl group with active hydrogen compounds and a host of other reagents. The products have been widely tested for crosslinking reactions, crease-proofing textiles, curing resins, forming polymers and resins and many other purposes.

Varied aziridinyl compounds prepared and investigated in the past have included hydrocarbon derivatives (U.S. 3,231,563), hydroxy hydrocarbon derivatives (U.S. 3,165,509), carboxyl derivatives (U.S. 3,038,776 and 3,182,040), phosphoric acid derivatives (U.S. 2,606,901), phosphinic acid derivatives (U.S. 3,205,034), urea derivatives (U.S. 3,266,931) and thiophosphoric acid derivatives (U.S. 2,672,459). Tables of these and other aziridinyl compounds are given in U.S. 3,260,702 and 3,115,490.

Broadly, aziridinyl compounds containing silicon are not new, e.g., see German Pat. 834,990 of 1952 which concerns compounds in which the aziridinyl group is attached directly through the nitrogen atom to silicon. U.S. Pat. No. 3,243,429 covers silicon compounds in which the silicon atom contains three alkoxy groups and is connected to the aziridinyl group by the carbon atom of an intermediate hydrocarbon chain of five carbon atoms containing an ester group.

OBJECTS

A principal object of this invention is the provision of new compounds containing aziridinyl and silane groups.
Further objects include the provision or attainment of the following:
(1) New aziridinyl silane compounds.
(2) New carboxy aziridinyl silane compounds.
(3) New compounds containing both aziridinyl and silane groups which can be reacted with a variety of organic and inorganic substances to produce new combinations of monomeric and polymeric products.
(4) New aziridinyl compounds which may be reacted with proton-active substances to create modified products including silane groups which may then be employed in further reactions.
(5) New methods for the production of aziridinyl silane compounds.

Other objects and further scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

GENERAL DESCRIPTION

These objects are accomplished according to the present invention by the reaction of certain aziridinyl compounds with certain silanes to form compounds of the class represented by the following formula:

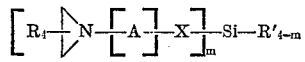

where R is hydrogen or an alkyl group of from 1 to 6 carbon atoms,
where R' is an alkyl, alkoxy, alkylthio, cycloalkyl, cycloalkoxy, or cycloalkylthio group of from 1 to 6 carbon atoms,
where each R and each R' may be the same or different,
where X is 0, S, or

where A is a hydrocarbon chain which can be interrupted by ether, thioether, ester, or

linkages, which can contain alkoxy, alkyl thio, or acetal side groups that are attached to the carbon atoms of the hydrocarbon chain and that do not interfere (react) with the aziridinyl radical, and which has a total of from 2 to 20 carbon atoms, the nitrogen atom of the aziridine group being attached to a carbon atom of A, X being attached to a carbon atom of A, and where $m$ is an integer of from 1 to 4.

A preferred group of new compounds of the invention are those in which R is hydrogen and especially those in which three of the R's are hydrogen and the remaining R is of said alkyl group. Also a preferred group of the new compounds are those in which R' is an alkyl radical. Yet another preferred group of the new compounds are those in which A contains an ester linkage and A has a total of from 4 to 16 carbon atoms.

The new compounds may be advantageously prepared by reacting an aziridinyl compound of the formula:

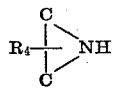

I wherein R has the meaning hereinbefore defined, with a silane that contains an activated double bond having the formula:

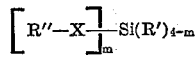

II wherein R'' is a monovalent hydrocarbon radical or chain containing an activated double bond and which can be interrupted by ether, thioether, ester, or

linkages, which can contain alkoxy, alkyl thio, or acetal side groups that are attached to the carbon atoms of the hydrocarbon chain and that do not react with the aziridinyl radical, and which has a total of from 2 to 20 carbon atoms, X being attached to a carbon atom of R'' while X, $m$ and R' have the meaning hereinbefore defined.

A preferred class of the unsaturated silanes for use in this reaction are acrylato alkoxy alkyl silanes of the following formula:

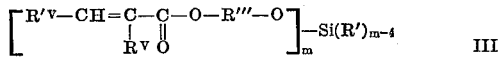

III wherein R''' is a bivalent aliphatic hydrocarbon radical of 1 to 6 carbon atoms,
$R^{IV}$ is hydrogen or a 1 to 5 carbon atom alkyl group, or 1 to 5 carbon alkenyl,
and $R^V$ is hydrogen, methyl or ethyl.

When these preferred unsaturated silanes are reacted with the preferred aziridine compounds as disclosed herein, there are obtained novel aziridinyl crosslinking compounds having the general formula:

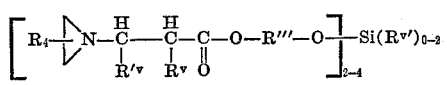

where R''', $R^V$ and $R^{v'}$ have the significance as set forth above, $R^v$ is an alkyl group of from 1 to 6 carbon atoms, four of the Rs are hydrogen or three of the Rs are hydrogen and one is an alkyl radical of 1 to 6 carbon atoms.

The reagents I, II and III as hereinbefore defined should be free of active or activatable halogen, sulfur, and phosphorous atoms which would interfere with the reaction such as those atoms combined in sulfonic acid groups, phosphonic acid groups, mercaptans, alkyl halides, acid halides, sulfonyl halides, phosphonyl halides, etc. They should also be free from acid groups such as carboxylic acid groups. In the case of reagent I, the critical group is the aziridinyl group and in the case of reagents II and III, an essential group is the radical containing the activated double bond or the olefinic group vicinal to the carboxyl group.

The new compounds may also be prepared by reacting an aziridinyl compound of the formula:

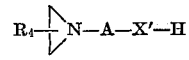

IV wherein the groups R and A have the meaning hereinbefore defined, X' is oxygen or

in the presence of a basic HCl scavenger, with a halosilane, preferably a chlorosilane, of the formula:

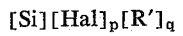

V where $p=1$ to 4 and $q=0$ to 3, and where the total of $p$ and $q=4$, and
wherein Hal is a halogen atom and R' has the meaning hereinbefore defined.

DESCRIPTION OF PREFERRED EMBODIMENTS

The following details of actual operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

β-N-ethyleniminopropionoxy ethoxy trimethyl silane was prepared by adding 37 parts of ethylenimine to 157 parts acrylatoethoxy trimethyl silane in a glass reaction vessel with stirring. Intermittent cooling kept the temperature below 35° C. After standing 12 hours, the reaction mixture was distilled under vacuum yielding 173 parts β-N-ethyleniminopropionoxy ethoxy trimethyl silane (yield 89% of theory). B.P. 66°–69° C./0.2 mm.

*Analysis.*—Calcd. (percent): Az, 18.9; N, 6.2. Found (percent): Az, 17.7; N, 6.3. The reaction proceeding according to the equation:

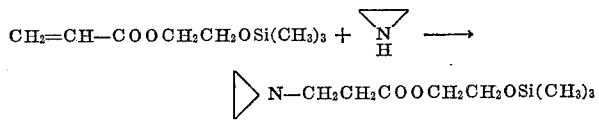

EXAMPLE 2

Di(β - N - ethyleniminopropionoxy ethoxy) dimethyl silane was prepared by adding 41.2 parts ethylenimine to 137 parts di(acrylatoethoxy) dimethyl silane with stirring and intermittent cooling to keep the temperature below 30° C. The material did not distill to 170° C. under 0.1 mm. Hg vacuum.

*Analysis.*—Calcd. (percent): Az, 22.4; N, 7.5. Found (percent): Az, 21.9; N, 6.9.

EXAMPLE 3

β-N-ethylenimino ethoxy trimethyl silane was prepared by first dissolving 54.5 parts of trimethylchlorosilane in 130 parts of benzene. The solution was slowly added to a solution of 43.5 parts hydroxy ethyl ethylenimine in 219 parts triethylamine, with stirring and intermittent cooling to keep the temperature below 35° C. The precipitation of triethylamine hydrochloride during the addition hindered stirring, so 440 parts benzene and 340 parts heptane were added as diluents. The mixture was stirred one hour after completing the addition and triethylamine hydrochloride was removed by filtration. The mixture was fractionated under vacuum. The product fraction was refractionated yielding 40 parts β-N-ethylenimino ethoxy trimethyl silane. B.P. 50°–55° C./14 mm.

*Analysis.*—Calcd. (percent): Az, 26.4; N, 8.8. Found (percent): Az, 26.5; N, 8.8.

EXAMPLE 4

Di(β-N-ethyleniminoethoxy) dimethyl silane was prepared by adding 64 parts dichlorodimethyl silane in 100 parts hexane to 87 parts hydroxy ethyl ethylenimine in 438 parts triethylamine, with stirring and cooling to keep the temperature below 35° C. The triethylamine hydrochloride which formed was then filtered out and the filtrate was distilled under vacuum and 69 parts product recovered having a B.P. 90° C. at 3.5 mm.

*Analysis.*—Calcd. (percent): Az, 36.5; N, 12.1. Found (percent): Az, 35.9; N, 11.3.

EXAMPLE 5

Di(β - N - propyleniminopropionoxyethoxy)dimethyl silane was prepared by adding 8.1 parts propylenimine to 22 parts di(acrylatoethoxy) dimethyl silane with agitation and cooling to keep the temperature below 35° C. The material was heated to 50° C. under 1 mm. Hg vacuum but did not distill.

*Analysis.*—Calcd. (percent): Az, 20.9; N, 7.0. Found (percent): Az, 21.0; N, 8.4.

EXAMPLE 6

In another case the product of Example 5 was prepared by adding 20 parts propylenimine to 50 parts di(acrylatoethoxy) dimethyl silane with agitation and cooling to keep the temperature below 50° C. After the addition was completed, the mixture was heated to 50°–55° C. for two hours. Removal of lower boiling material under vacuum gave 55 parts of product which did not distill to 175° C. at 0.2 mm.

*Analysis.*—Calcd. (percent): Az, 20.9; N, 7.0. Found (percent): Az, 18.4; N, 6.4.

$N_D^{25}=1.4630$.

EXAMPLE 7

Di(β - N - butyleniminopropionoxyethoxy) dimethyl silane was prepared by adding 30 parts of butylenimine to 50 parts of di(acrylatoethoxy) dimethyl silane with agitation and cooling to keep the temperature below 50° C. The mixture was then heated to 50–55° C. for two hours. Distillation under vacuum gave 56 parts of the product residue which did not distill to 190° C. at 0.15 mm.

*Analysis.*—Calcd. (percent): Az, 19.5; N, 6.7. Found (percent): Az, 17.3; N, 5.9.

$N_D^{25}=1.4603$.

EXAMPLE 8

Di(β-N-ethyleniminoethoxy) dimethyl silane was used to cure a liquid carboxy terminated polybutadiene by mixing 5 parts of carboxy terminated polybutadiene (0.414 meq. COOH/g.) with .24 part of di(β-N-ethyleniminoethoxy) dimethyl silane (2.07 meq. aziridine).

The components were mixed in a vial and cured 1.5 hours at 120° C., yielding a very soft rubber.

EXAMPLE 9

Di(β - N - propyleniminopropionoxyethoxy) dimethyl silane was used to cure a liquid carboxy terminated polybutadiene. In carrying out the operation, 5 parts of the carboxy terminated polybutadiene (0.414 meq. COOH/g.) were used with .42 part (2.07 meq. aziridine) of di(β-N-propyleniminopropionoxyethoxy) dimethyl silane.

The components were mixed in a vial, cured one hour at 120° C., yielding a soft rubber.

DISCUSSION OF DETAILS

The aziridinyl compounds (reagents I and IV), unsaturated silanes (reagents II and III) and halosilanes (reagent V) may be, in many cases, obtained commercially although their preparation using known procedures may be used to obtain them, particularly the more highly substituted high molecular weight compounds. Advantageously, these reagents may be freshly purified such as by distillation immediately prior to use in carrying out the reactions as herein described in order to remove polymerization inhibitors and other additives or impurities which might be present in the products.

Representative examples of aziridinyl compounds of the structure of reagent I as hereinbefore defined include:

ethylenimine
2-methyl aziridine
2-ethyl aziridine
2,2,3,3-tetramethyl aziridine
2-butyl aziridine
2-methyl-3-propyl aziridine
2-methyl-3-butyl aziridine
2,2-dimethyl-3-ethyl aziridine
2,2-diethyl aziridine.

The chemical structure of the aziridinyl reagent employed in the reactions effects the chemical reactivity and physical properties of resulting products. Unsubstituted ethylenimine generally creates final products of greatest reactivity. Substitution, particularly with alkyl groups of higher molecular weight, creates final products of lesser chemical activity, and resulting polymeric products made from them are softer.

The products of the invention are also influenced by the structure of the unsaturated silane compound selected from those having the structural formula of reagent II as hereinbefore defined. When the silane compound is substituted with lower alkyl groups, e.g., methyl or ethyl, and the unsaturated group R″ is low in molecular weight, polymeric products made of the resulting adducts are the hardest. As the molecular weight of the unsaturated group R″ is increased, resulting products become softer and also, the general chemical reactivity of the adduct is lower.

Representative examples of aziridinyl carboxyl silanes within the class of reagents II as hereinbefore defined include:

acrylato ethoxy trimethyl silane
acrylato butoxy triethyl silane
di(acrylatoethoxy) dimethyl silane
tri(acrylatoethoxy) methyl silane
tetra(acrylatoethoxy) silane
acrylato ethoxy methyl ethyl methoxy silane
tri(allyloxypropoxy) cyclobutyl silane
di(crotyloxyhexoxy) diethoxy silane
di(methacrylato eththio) dimethyl silane
acrylato ethamino methyl dieththio silane
di(acrylato butoxy) dihexyl silane
acrylato ethoxy tricyclohexoxy silane
tri(acrylato hexoxy) methyl silane
tetra(1-buteneoxy-4) silane
di(β-cyclohexylacrylato butoxy) dimethyl silane Representative examples of aziridinyl compounds within the class of reagents IV as hereinbefore defined include:

hydroxylethyl ethylenimine
4-aziridinyl butanol-1
6-aziridinyl hexanol-1
12-aziridinyl octadecanol-1
4-(2,2-diethyl-3-propyl aziridinyl)butanol-1
3-(tetramethyl aziridinyl)propanol-1
4-(N-ethylenimino) butanol
4-(2-ethyl-3-methyl aziridinyl)-1-amino butane thioethyl ethylenimine
hydroxyethylethoxyethylenimine
hydroxyoctylbutoxyethylenimine
3-(N-ethylenimino)-2-butoxy ethanol
monoester of butane diol-1,4 and 1-6-aziridinyl butanoic acid-4

Representative examples of aziridinyl silanes within the new class of compounds of the invention as hereinbefore defined include:

(β-N-ethyleniminopropionoxyethoxy) trimethyl silane
di(β-N-ethyleniminopropionoxyethoxy) dimethyl silane tri(β-N-ethyleniminopropionoxyhexoxy) methoxy silane
di(β-N-ethylenimino ethoxy) dimeththio silane
2-triethylsiloxyethyl-3-(N-ethylenimino) propionate
3-(methyl dibutyl siloxy) hexyl-3-(N-ethylenimino-2-amyl)propionate
2-triethylsiloxyethyl-3-(N-ethylenimino)caproate
4-trimethylsiloxycyclopentyl-3-(2-ethyl-3-methyl aziridino)butyrate
(4-trimethylsiloxy butyl)-3-(2-hexyl-2-methyl-3-ethyl aziridino)-2-ethyl propionate
2-(methylethylamylsiloxy)ethyl-3-(N-ethylenimino) propionate
(3-trimethylsiloxy cyclohexyl)-3-(2,2-dihexyl aziridino)-2-methyl propionate
tetra(β-N-butylenimino octadecathio) silane
tri(β-N-propylenimino octadecaoxy) methyl silane
tetra(β-N-propyleniminopropionoxy butoxy) silane
di(β-N-propyleniminohexoxy butoxy)dicyclohexoxy silane
di(β-N-butyleniminopropoxyethoxy) diethyl silane
di(β-N-ethylenimino(3-allyl)propionoxy ethoxy) dipropyl silane
tri(β-N-hexylenimino propoxy ethoxy) cyclohexyl thio silane
di(β-N-ethyleniminomonoamino)dipropyl silane
[(2-triethylsiloxy-4-isopropyl)benzyl]-3-aziridino-caprylate
tetra(β-N-ethyleniminopropionoxyeththio silane
di(β-N-ethylenimino ethamino)dimethyl silane
tri(β-N-ethylenimino-2-butanthio) ethyl silane Determination of chemical composition of products resulting from practice of the invention can be obtained by analysis of reaction products for nitrogen content, aziridine content and other atom or molecular group content according to established analytical procedures. Aziridine content is a particularly useful technique and known method for such analysis involves opening of the aziridine ring as reported in J.A.C.S 77, 5918 (1955).

In carrying out the reactions as described hereinbefore for the production of the new aziridinyl silanes, the reaction conditions may be varied and will depend to some extent on the exact reagents used in preparing the desired products. Temperatures between 0 and 100° C. are useable although temperatures between 10–60° C. are advantageously used with the majority of reagents. Proportions of the reagents may also be varied, e.g., a ratio of from about 1 to 4 mols of aziridinyl reagents to 4:1 mols of silane reagent depending on the number of aziridinyl end groups desired. Preferably an excess of the aziridine reagent is used so that the desired reaction will go forward properly. Usually the reactions are conducted using a solvent or diluent that is unreactive to the reagents. In the case of the reaction of reagent type IV with reagent type V, a hydrogen halide, HCl, scavenger is employed and this may also serve as a diluent. At least one mol of scavenger is used for each calculated mol of HCl that will be formed and advantageously 2 to 10 mols of scavenger are used per mol of evolved HCl. Tertiary amines such as triethyl amine, phenyl dimethyl amine, etc., heterocyclic basic compounds known in the art as useful as HCl scavengers may be employed.

Recovery of the desired product from the reaction mixture may be performed in any suitable manner, e.g., solvent extraction, distillation, vacuum distillation, adsorption, chromatographic separation, etc.

The new aziridinyl silanes are reactive compounds and may be used for a variety of purposes. The aziridinyl groups react with organic acids and polymers containing —COOH groups to form aminoethylene groups. The mechanism is reported in J. Org. Chem. 9, 500 (1944). The aziridinyl group can react with epoxides to form hydroxy ethylene groups (see U.S. 2,475,068) and with hydroxy groups, e.g., as present in polyols, epoxy resins, etc., to form aminoethoxy groups (see J.A.C.S., 77, 5116 (1955). There is, accordingly, in such polymer reactions possible multiplication of functional groups using the new compounds rendering these materials useable in crosslinking and chain-ending reactions. Combinations of crosslinking and chain-ending in controlled proportions and degrees in polymers is also possible using mixtures of the new compounds, e.g., propellants.

Monomeric or polymeric carboxylic acids, anhydrides, acid chlorides, mercaptans, sulfonic acids, phosphonic acids, or their corresponding acid halides, epoxy compounds, epoxy resins, amines, hydrazines, amides, hydrazides, and other functional groups which react with the aziridine ring, can be modified or cross-linked with the above mentioned azirindyl silane compounds. Polymers without functional groups can also be blended into these compositions as also may plasticizers, elastomers and the like. The new compounds can be used as chain terminators for —COOH containing polymers such as carboxylated polybutadienes, butadiene-styrene-acrylic acid copolymers, carboxyl terminated polyureas and urethanes, etc. In such reactions, the resulting polymers acquire silane groups, with the properties associated with such groups. Such copolymers are, accordingly, useful as coatings on plastics to provide improved slip as well as resistance to whitening and blanching by water. Products of a plastic or resinous nature formulated from the new compounds may also be used to make gaskets, puttys, caulking compounds for doors, as weather-stripping, etc.

In forming plastic or other compositions using the new products of this invention as ingredients or as reactants it may be advantageous to incorporate other added materials, e.g., fillers, dyes, pigments, plasticizers, extenders, inhibitors, fire-resistant materials and the like. Examples of materials which fall in these categories and which may be usefully included in new adhesive compositions include: zinc oxide, carbon black, iron oxides, chalk, titanium dioxide, silicon dioxide, mica, asbestos, glass fibers, cellulosic fibers, synthetic fibers, alumina, antimony oxide, zinc borate, synthetic rubbers, polyester resins, polyurethane resin and the like. Such added materials may comprise 0.01 to 50% of the total adhesive and advantageously between about 0.1 and 10%. Where dilution of the compositions may be desirable for spreading or coating purposes or for other reasons, solvents or inert extenders may be employed. Examples of useful solvents include hydrocarbons such as heptane, cyclohexane, toluene, benzene, halogenated hydrocarbons, such as carbon tetrachloride, chloroform, trichloroethylene, and the like, or organic esters, ethers and similar organic liquids normally classified as solvents. When and if used, solvents may advantageously comprise 10 to 90% by weight of the total composition.

Compounds such as those designated by Formula IV above can readily be made by reacting a hydroxy alkyl acrylate or alkacrylate or other unsaturated alcohol or amine with an aziridine, i.e., butylenimine, as shown by Formula I above where the aziridine adds across the double bond. On the other hand, compounds illustrated by Formula II above can be made by reacting a similar acrylate, hydroxy compound or amine, or the corresponding sulfide, with a halosilane, i.e., dimethyldichlorosilane.

The embodiments of the invention in which an exclusive property or right is claimed are defined as follows:

1. An aziridinyl silane of the general formula:

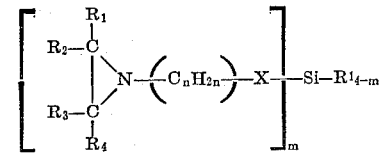

wherein:

R₁, R₂, R₃ and R₄ are hydrogen or an alkyl group or from 1 to 6 carbon atoms,

R¹ is 1 to 6 carbon atoms alkyl, where each R¹ may be the same or different, m is the number 2, 3 or 4,
n is an integer from 2 to 20,
X is —O—, —S—, or

 and

R is hydrogen or an alkyl group of 1 to 6 carbon atoms.
2. As the aziridinyl silane of claim 1, di ($\beta$-N-ethyleniminoethoxy) dimethyl silane.
3. As the aziridinyl silane of claim 1, tetra ($\beta$-N-butylenimino octadecathio) silane.
4. As the aziridinyl silane of claim 1, tri ($\beta$-N-propylenimino octadecaoxy) methyl silane.
5. As the aziridinyl silane of claim 1, di ($\beta$-N-ethyleniminoethamino) dimethyl silane.
6. As the aziridinyl silane of claim 1, tri ($\beta$-N-ethylenimino-2-butanthio) ethyl silane.

References Cited

UNITED STATES PATENTS 3,243,429   3/1966   Ham _____ 260—239

OTHER REFERENCES

Nametkin et al., Khim, Geterotsikl, Soedin., vol. 3, pp. 106–109 (1967) (Sci. Lib.)

Rochow, Chemistry of the Silicones (second ed., New York, 1951), p. 56. (Sci. Lib).

ALTON D. ROLLINS, Primary Examiner

U.S. Cl. X.R.

260—94.6, 448.8 R, 448.8 A

PO-1050
(5/69)

UNITED STATES PATENT OFFICE
CERTIFICATE OF CORRECTION

Patent No. 3,711,466          Dated January 16, 1973

Inventor(s) Heinz Uelzmann and David C. Hidinger, Jr.

It is certified that error appears in the above-identified patent and that said Letters Patent are hereby corrected as shown below:

Column 3, lines 60-61, should read:

---where $R^{III}$, $R^{IV}$ and $R^V$ have the significance as set forth above, $R^{VI}$ is an alkyl group of from 1 to 6 carbon atoms; ...---.

Column 8, line 13, which reads "azirindyl" should read ---aziridinyl---.

Signed and sealed this 29th day of May 1973.

(SEAL)
Attest:

EDWARD M. FLETCHER, JR.
Attesting Officer

ROBERT GOTTSCHALK
Commissioner of Patents